J. O. FISHER.
POSITIVELY ACTING CLUTCH.
APPLICATION FILED DEC. 11, 1917.

1,315,715.

Patented Sept. 9, 1919.
2 SHEETS—SHEET 1.

Inventor
J. O. Fisher, by
F. A. Witherspoon
Attorney

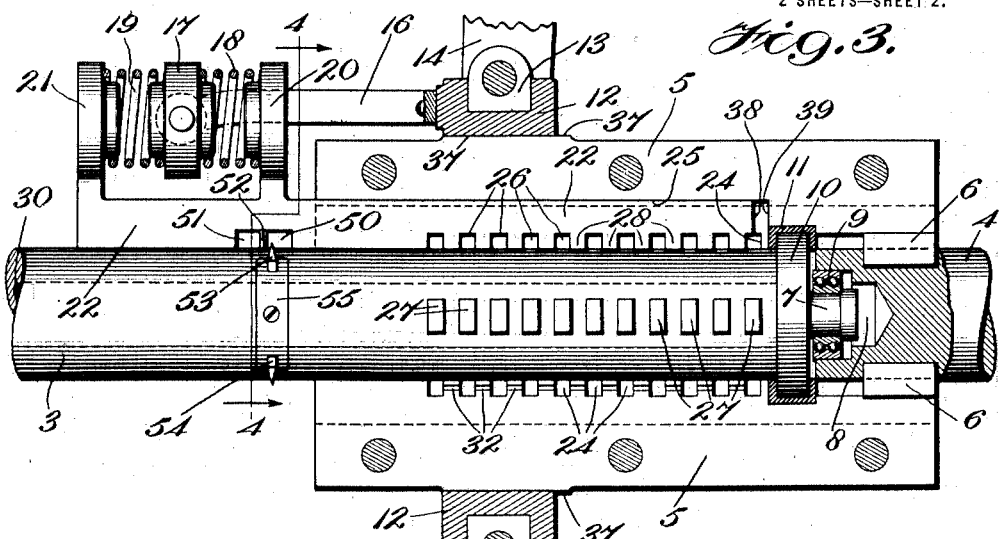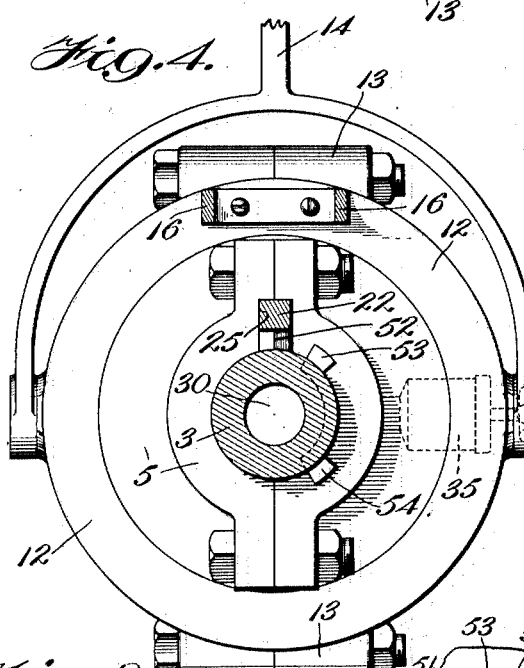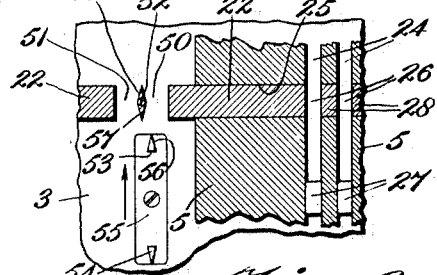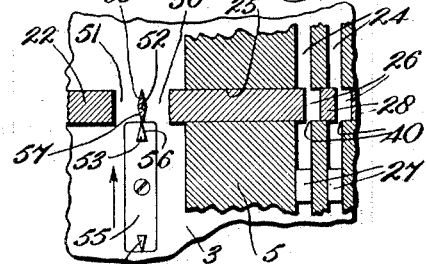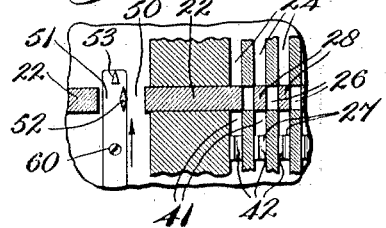

UNITED STATES PATENT OFFICE.

JOSEPH O. FISHER, OF THE UNITED STATES NAVY.

POSITIVELY-ACTING CLUTCH.

1,315,715.  Specification of Letters Patent.  Patented Sept. 9, 1919.

Application filed December 11, 1917. Serial No. 206,656.

*To all whom it may concern:*

Be it known that I, JOSEPH O. FISHER, a lieutenant commander in the United States Navy, and a citizen of the United States, residing at Washington, in the District of Columbia, have invented certain new and useful Improvements in Positively-Acting Clutches; and I do hereby declare the following to be a full, clear, and exact description of the invention, such as will enable others skilled in the art to which it appertains to make and use the same.

This invention relates to clutches employing positively engaging members, and has for one of its objects to provide a cushioning means which will be more certain and efficient in action than those heretofore proposed.

With this and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Fig. 3 is a longitudinal part sectional view of a portion of the parts shown in Fig. 1;

Fig. 4 is a sectional view taken on the line 4—4 of Fig. 3;

Fig. 5 is a diagrammatic sectional view illustrating the operation of the key coupler and its coacting parts;

Fig. 6 is a view similar to Fig. 5, showing the parts in a slightly different position;

Fig. 7 is a view similar to Fig. 6, showing the parts in a still different position; and Fig. 8 represents a view similar to Fig. 7, showing a slightly modified form of the invention.

Figure 1:
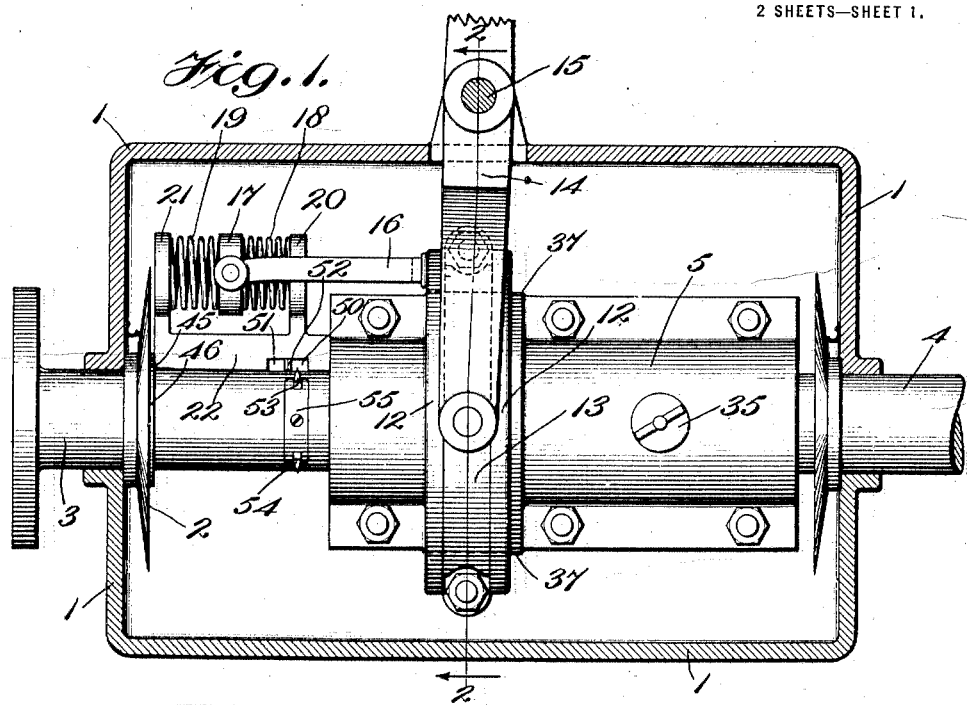
Figure 1 is a side elevational partly sectional view of a clutch made in accordance with this invention.

1 indicates any suitable casing, 2 oil slinger in said casing, 3 a driving shaft, 4 a driven shaft, 5 a coupling or sleeve keyed to shaft 4, as at 6 and rotating therewith, 7 an extension of the shaft 3 entering a depression or chamber 8 in the shaft 4, provided with the ball bearings 9 as shown. 10 represents a collar or enlargement on the shaft 3 fitting the flanged ring 11 carried by the sleeve 5, 12 represents a ring slidably fitting the exterior of, and rotating with, said sleeve 5, and also provided with the ring member 13 adapted to be actuated in the usual manner by the clutch operating lever 14 pivoted at 15 to the casing 1, as shown.

From said ring 12 projects the U-shaped member 16, provided between its extensions with the button like member 17 positioned between the coiled springs 18 and 19 as shown. Said springs are held by the lugs or extensions 20 and 21 respectively which in turn are carried by the key like coupling member 22 as shown.

Said rotating coupling sleeve 5 is provided with a plurality of annular grooves 24, and also with a longitudinally extending slot 25 crossing said grooves as illustrated. Said key like coupling member 22 reciprocates in said groove 25, and is provided with a plurality of notches 26 of the same cross sectional dimensions as, and adapted to register with, said grooves 24, as best illustrated in Fig. 5.

The shaft 3 is provided with a plurality of lugs 27, one for each groove 24, which substantially fit fluid tight said grooves 24, and rotate continuously in said latter grooves when the shafts 3 and 4 are not coupled together. But, when said key coupler 22 is so positioned that its lug like members 28 occupying the spaces between the notches 26, are located across the paths of said lugs 27, as indicated, in Figs. 7 and 8, then the said shaft 3 will be coupled with the member 5 and shaft 4 as will appear more fully below.

The shaft 3 is preferably provided with a hollow or space 30 adapted to contain oil or other fluid, and with one or more passages 31 leading from said space 30 to said grooves 24. To facilitate the passage of the fluid from one groove 24 to another additional passages or ports 32 may connect said grooves 24 as best indicated in Figs. 2 and 3. Should an oil or grease be employed that does not flow freely, it may be held in the usual cup 35, (see Figs. 1 and 4). Ordinarily, however, I prefer to employ a freely flowing oil and to keep the grooves 24 and space 30 well filled therewith in a closed system. So far as has now been disclosed the operation is as follows:

Supposing said grooves 24 and the space 30 to be filled with oil and closed fluid tight, and supposing the clutch lever to be in such a position that the notches 26 are in register with the grooves 24 and lugs 27. Power being applied to the shaft 3, it will rotate continuously and idly without transmitting any power to shaft 4, because the said lugs 27 will merely move the oil around in the grooves 24 with a minimum of friction as there will be no appreciable work done on the oil. On the other hand, suppose the clutch lever 14 is so moved as to slide the ring 12 on the surface 37 of the coupler 5 toward the right as seen in Fig. 3. The member 16 and button 17 will now be moved toward the right as seen in said figure against the compression of spring 18, the key coupler 22 will be moved in the same direction until its extreme end 38 strikes the end 39 of the slot 25, all as will be clear from Figs. 2 and 3. When the coupler or key 22 is thus positioned its lugs 28 will block the paths of the rotating lugs 27, and any oil that may not escape from between said lugs 28 and 27 through the passages 40, (see Fig. 6) afforded by the notches 26, while the key 22 is being moved, will be trapped between said lugs 27 and 28, as is indicated in Fig. 8.

The escape of the said oil through the rapidly closing passages 40, however, will afford a cushioning action which will prevent the shock that would otherwise take place, should the lugs 27 and 28 be moved suddenly into contact. This said cushioning action is further greatly enhanced by the oil trapped in the spaces such as 41, (Fig. 8), for the pressure or turning moment between the two shafts 3 and 4 is now brought on to said trapped oil, and as some leakage is inevitable, said trapped oil will be more or less gradually forced out of said spaces 41, and the lugs 27 and 28 thus be gradually brought into contact, as illustrated in Fig. 7.

There will be some heating of the oil as it is forced through restricted passages such as 40, and out of spaces such as 41, but in practice the clutching operations are found to be too infrequent to cause this heating to be of consequence. When rather heavy oils, or a grease, are employed I prefer to provide a leak such as indicated by the grooves 42, (Fig. 8), so that the lugs 27 and 28 will approach gradually and with certainty until a contact is had.

It will now be clear that the foregoing mechanism affords a gradually acting, cushioned clutch having positive engaging faces between the driving shaft 3 and sleeve 5. The said coupling sleeve 5 being keyed to the shaft 4, as by the member 6, it transmits power from shaft 3 to shaft 4, or vice versa.

Figure 2:
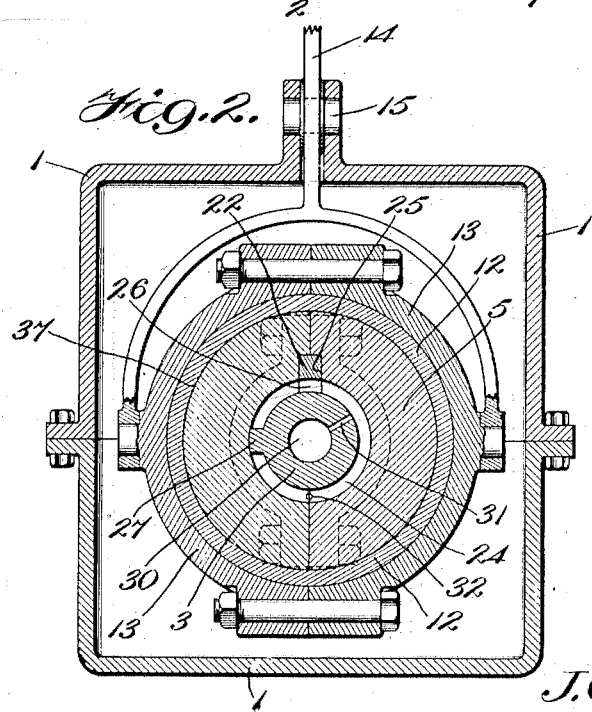
Fig. 2 is a sectional view taken on the line 2—2 of Fig. 1, looking in the direction of the arrows.

When it is desired to uncouple the shafts 3 and 4, it is only necessary to throw the clutch lever 14 in an opposite direction, whereupon the sleeve 12, and members 16 and 17 will move in an opposite direction against the compression of spring 19, or toward the left as seen in Fig. 3, until the other end 45 of key 22 strikes a stop 46 carried by the shaft 3, (see Fig. 1.) When the key coupler 22 has been thus moved its notches 26 will again register with the grooves 24 and lugs 27 so that shaft 3 will again run idly.

In some forms of machines it is desirable to insure that the lugs 27 will be within a given angular distance of the lugs 28 when the passage 40 become closed, so that there will always be present spaces such as 41 between said lugs after the closure of said passages 40 and consequently a definite cushioning action due to a predetermined amount of leakage during each coupling action. Such definite cushioning action is very desirable in all those classes of machines running at a high speed, and which require a positively engaging clutch to transmit the power, but cannot tolerate substantial shocks due to the clutching action.

In order to meet these exacting requirements I provide the coupling member 22, with the notches 50 and 51 separated by the lozenge shaped member 52, and I provide the shaft 3 with the tapered lugs 53 and 54 separated a definite angular distance 55 apart. The said lugs 53 and 54 are located an equal angular distance respectively in advance of and behind the lugs 27 so that the centers of said lugs 27 occupy a line which if prolonged would bisect said distance 55. It therefore results that should the shaft 3 be rotating in the direction of the arrow when the parts are in the positions shown in Fig. 5, and should the key coupler begin to move toward the right, as seen in said figure, then the side 56 of the lugs 53 will contact with the side 57 of the member 52, as illustrated in Fig. 6, and cause the passages 40 to be closed by the time the lugs 27 having reached the definite predetermined angular distance from the lugs 28.

If the distance 55 between the lugs 53 and 54 has a value like that indicated in Figs. 3, 5, 6 and 7, this said definite distance that will be preserved between the lugs 27 and 28 will not be very great and therefore the cushioning action might be comparatively small when transmitting large powers at high speeds.

On the other hand, if said angular distance 55 is made larger, as is indicated by the angular distance 60 in Fig. 8, then this said definite distance between the lugs 27 and 28 will be indicated by the spaces 41, and any desired cushioning action can be readily had by regulating the leakage out of said spaces through regulating the capacity of the grooves 42, for example.

Should a fly wheel associated with the driven shaft over run the driving shaft, due to variable torques or other causes after a positive clutching action has been accomplished, then the lugs 28 will travel faster than the lugs 27 and after gaining an advance of 360 degrees said lugs will again become positively engaged, so that the power of the fly wheel will be transmitted to the driving shaft. But in such cases, the lugs 28 will remain across their respective grooves so oil will be trapped in front of the more rapidly moving lugs 28. Therefore, the pressure of said oil will drive the lugs 27 until leakage permits said lugs to come together again, thus affording a cushioning action, as in the first engagement.

It will now be clear that this clutch may be used either with or without the lugs 53 and 54, and if said lugs are employed a definite predetermined controllable cushioning action can be obtained for a wide range of speeds. Especially is this the case when the lever 14 is so manipulated as to always stop its motion at such a point that the face 56 of the lug 53 will be sure to engage the face 57 of lug 52. For, in such cases an opening 40 will be provided for the leakage after the lever 14 has completed its stroke. Should the shaft 3 be turned in an opposite direction from that indicated by the arrows in Figs. 5, 6 and 7, then the lug 54 will act on the first face such as 65 of the member 52 it meets, and the operations above described will follow.

It will also be seen that when the coupler 22 is being moved toward the left as seen in Fig. 3, or to its idle position, the lugs 53 and 54 will act in the manners above described to insure that the lugs 28 have moved out of the way of the lugs 27, before the latter reach the coupler 22.

It is obvious that those skilled in the art may vary the details of the construction as well as the arrangement of parts without departing from the spirit of the invention, and therefore, I do not wish to be limited to the above disclosure except as may be required by the claims.

What I claim is:—

1. In a clutch the combination of driving and driven shafts; means associated with one of said shafts constituting a clutch engaging face; means associated with the other of said shafts constituting another clutch engaging face; means to move one of said engaging faces into and out of the path of travel of the other engaging face; and means to hold a fluid between said faces before the clutching action is completed, substantially as described.

2. In a clutch the combination of driving and driven shafts; means associated with one of said shafts constituting a clutch engaging face; means associated with the other of said shafts constituting another clutch engaging face; means to move longitudinally of one of said shafts one of said engaging faces into and out of the path of travel of the other engaging face; and means comprising a groove to hold a fluid between said faces before the clutching action is completed, substantially as described.

3. In a clutch the combination of driving and driven shafts; a coupling member associated with one of said shafts; means constituting a clutch engaging face associated with the other of said shafts; slidable means associated with said coupling member provided with a second clutch engaging face; and means to hold a fluid between said faces, substantially as described.

4. In a clutch the combination of driving and driven shafts; a coupling member associated with one of said shafts; means constituting a clutch engaging face associated with the other of said shafts; slidable means provided with a notch associated with said coupling member and provided with a second clutch engaging face; and means to hold a fluid under compression between said faces, substantially as described.

5. In a clutch the combination of driving and driven shafts; a coupling member associated with one of said shafts; means constituting a clutch engaging face rigidly associated with the other of said shafts; slidable means provided with a notch associated with said coupling member and provided with a second clutch engaging face; and means comprising a groove with which said last named face is adapted to coact to retard the passage of the fluid between said faces, substantially as described.

6. In a clutch the combination of driving and driven shafts; a coupling member provided with a groove adapted to hold a fluid connected to one of said shafts; a clutch engaging face adapted to move in said groove and rigid with the other of said shafts; means provided with a notch adapted to register with said groove and with a second clutch engaging face adapted when moved to extend across said groove; and means to so move said first named means as to cause said notch and said second clutch engaging face to move into and out of said groove, substantially as described.

7. In a clutch the combination of driving and driven shafts; a coupling member provided with a slot and a groove adapted to hold a fluid connected to one of said shafts; a clutch engaging face adapted to move in said groove and rigid with the other of said shafts; means comprising a key like coupler located in said slot provided with a notch adapted to register with said groove and with a second clutch engaging face adapted when moved to extend across said groove; and means to so move said first named means in said slot as to cause said notch and said second clutch engaging face to move into and out of said groove, substantially as described.

8. In a cushioning means for positive engaging clutch faces, the combination of a rotating member provided with a groove adapted to hold a fluid; a second rotating member provided with a clutch engaging face adapted to move in said groove and drive said fluid before it; a second clutch engaging face associated with a notch capable of registering with said groove carried by said first named rotating member and adapted to move with said notch across said groove; and means to gradually move said second clutch engaging face across said groove to trap said fluid in said groove between said clutch engaging faces, substantially as described.

9. In a cushioning means for positive engaging clutch faces the combination of a rotating member provided with a groove adapted to hold a fluid; a rotating clutch engaging face moving in said groove; a reciprocating means provided with a second clutch engaging face and with a notch adapted to alternately register with said groove; and means adapted to gradually move said second face across said groove to trap said fluid in said groove between said faces, substantially a described.

10. In a cushioning means for positive engaging clutch faces the combination of a rotating member provided with a groove adapted to hold a fluid; a rotating clutch engaging face moving in said groove; a reciprocating means provided with a second clutch engaging face and with a notch adapted to alternately register with said groove; means adapted to gradually move said second face across said groove to trap said fluid in said groove between said faces; and automatic means to cause said second face to complete its motion across said groove when said first named face is at a predetermined distance from said second face, substantially as described.

11. In a cushioning means for positive engaging clutch faces, the combination of means to hold a fluid between said faces; means to slidably move one of said faces relatively to the other; and means to gradually trap said fluid between said faces, substantially as described.

12. In a cushioning means for positive engaging clutch faces, the combination of means to permit said faces to run idly; means to hold a fluid between said faces; means to slidably move one of said faces relatively to the other; and means to gradually trap said fluid between said faces, substantially as described.

13. In a clutch the combination of driving and driven shafts; means associated with one of said shafts constituting a clutch engaging face; means associated with the other of said shafts constituting a second clutch engaging face; means to move one of said engaging faces into and out of the path of travel of the other engaging face at any relative positions of the two engaging faces, substantially throughout an arc of 360°, and means to gradually trap fluid between said engaging faces, substantially as described.

In testimony whereof I affix my signature.

JOSEPH O. FISHER.